(12) United States Patent
Nazzaro et al.

(10) Patent No.: US 11,140,283 B2
(45) Date of Patent: Oct. 5, 2021

(54) ACTION TAGS FOR MULTI-FUNCTION DEVICES TO BUILD A JOB

(71) Applicant: Xerox Corporation, Norwalk, CT (US)

(72) Inventors: Cheryl A. Nazzaro, Fairport, NY (US); Sanja Pstrocki-Porras, Rochester, NY (US); Dianne Colelli, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/723,062

(22) Filed: Dec. 20, 2019

(65) Prior Publication Data

US 2021/0195040 A1   Jun. 24, 2021

(51) Int. Cl.
*H04N 1/00* (2006.01)
*G06F 16/93* (2019.01)
*G06F 3/12* (2006.01)

(52) U.S. Cl.
CPC ....... *H04N 1/00395* (2013.01); *G06F 3/1204* (2013.01); *G06F 3/1257* (2013.01); *G06F 16/93* (2019.01); *H04N 1/00482* (2013.01)

(58) Field of Classification Search
CPC ........... H04N 1/00395; H04N 1/00408; H04N 1/00482; H04N 1/00517; G06F 16/93; G06F 3/1204; G06F 3/1257
See application file for complete search history.

(56) References Cited

U.S. PATENT DOCUMENTS

| | | | |
|---|---|---|---|
| 7,649,643 B2 | 1/2010 | Salgado | |
| 8,132,151 B2 | 3/2012 | Ahern et al. | |
| 2010/0088382 A1* | 4/2010 | Lee | G06Q 10/00 709/206 |
| 2016/0155135 A1* | 6/2016 | Papa | G06F 16/93 705/37 |
| 2017/0070624 A1* | 3/2017 | Hanada | H04N 1/00506 |
| 2020/0210383 A1* | 7/2020 | Demaris | G06F 16/168 |

* cited by examiner

*Primary Examiner* — Iriana Cruz (57) ABSTRACT

A method for executing a job on a multi-function device (MFD) is disclosed. For example, the method is executed by a processor and includes receiving a selection of a workflow template, receiving a selection of an action tag to add to the workflow template, scanning a document, and executing the job on the document via the workflow template that includes the action tag that was selected.

16 Claims, 6 Drawing Sheets

ACTION TAGS FOR MULTI-FUNCTION DEVICES TO BUILD A JOB

The present disclosure relates generally to multi-function devices (MFDs) and, more particularly, to action tags for MFDs to build a job.

BACKGROUND

Multi-function devices (MFDs) can be used to perform a variety of different functions. For example, MFDs can be used to copy documents, print documents, fax documents, and the like. Typically, a user may have a computing device that is communicatively coupled to the MFD. The user may create an image to be printed on the computing device and send the image data to the MFD to be printed. In other examples, a document may be scanned by the MFD for printing, copying, faxing, emailing, and the like. However, current MFDs are limited with respect to what can be done with the document once scanned and saved to the MFD.

SUMMARY

According to aspects illustrated herein, there is provided a method, non-transitory computer readable medium, and an apparatus for executing a job on a multi-function device (MFD). One disclosed feature of the embodiments is a method that receives a selection of a workflow template, receives a selection of an action tag to add to the workflow template, scans a document, and executes the job on the document via the workflow template that includes the action tag that was selected.

Another disclosed feature of the embodiments is a non-transitory computer-readable medium having stored thereon a plurality of instructions, the plurality of instructions including instructions which, when executed by a processor, cause the processor to perform operations that receives a selection of a workflow template, receive a selection of an action tag to add to the workflow template, scan a document, and execute the job on the document via the workflow template that includes the action tag that was selected.

Another disclosed feature of the embodiments is an apparatus comprising a processor and a computer readable medium storing a plurality of instructions which, when executed by the processor, cause the processor to perform operations that receive a selection of a workflow template, receive a selection of an action tag to add to the workflow template, scan a document, and execute the job on the document via the workflow template that includes the action tag that was selected.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses action tags for multi-function devices (MFDs) to build a job. As discussed above, MFDs can be used to perform a variety of different functions. However, MFDs can currently lack some functionality. For example, some documents can be stored in the MFD. However, when a user wants to add these stored documents to another document as part of a job, the user has to print the stored document, combine the stored document with the current document, and then re-scan the combined pages of the two documents.

Moreover, the functionality associated with these stored documents may be limited to only printing. In other words, documents that are stored on the MFD can only be printed. No other actions are associated with the stored documents.

The present disclosure provides action tags that allow actions to be associated with the stored documents. Thus, additional functionality can be added to the stored documents in the MFD (or a remotely located server). Moreover, the action tags can be added to workflow templates. The action tags can be automatically executed as part of the selected workflow template. As a result, the user experience can be improved and jobs executed by the MFD may become more efficient.

Figure 1:
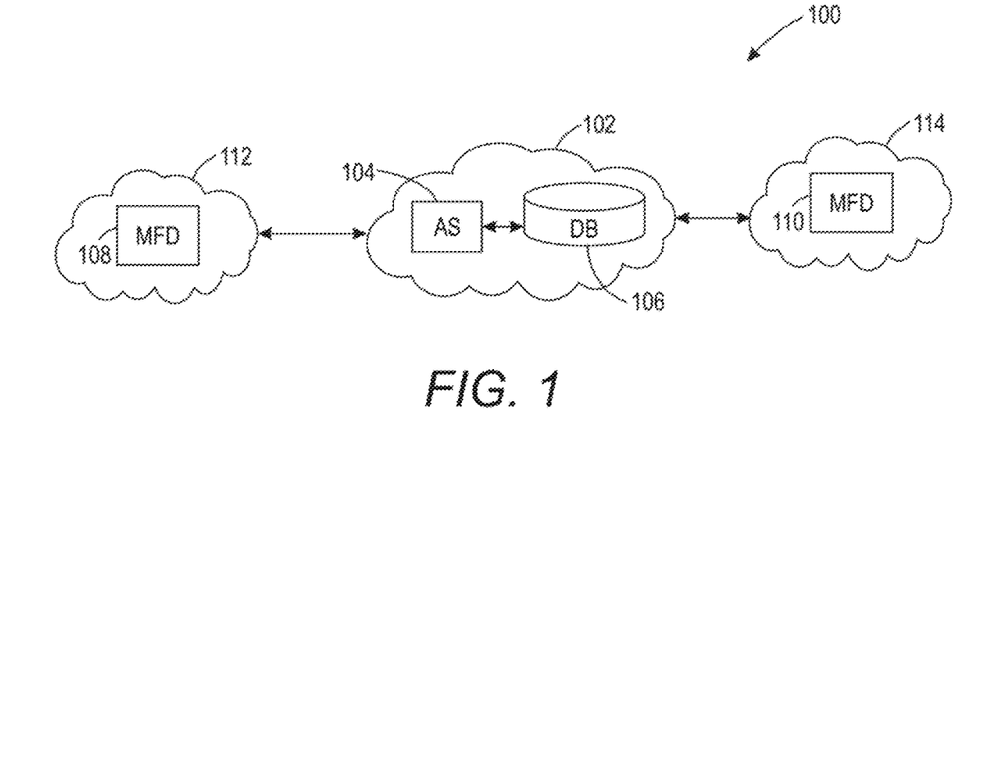
FIG. 1 illustrates a block diagram of a system of the present disclosure.

FIG. 1 illustrates an example system 100 of the present disclosure. In one embodiment, the system 100 may include a communication network 102 that includes an application server (AS) 104 and a database (DB) 106. Although the AS 104 and the DB 106 are illustrated as separate components, it should be noted that the AS 104 and the DB 106 may be deployed as a single device.

In one embodiment, the communication network 102 may be an Internet protocol (IP) network. The communication network 102 may be wide area network (e.g., across different geographic locations) or a local area network (e.g., a wireless network within a building). In one embodiment, references made to "the cloud" may refer to the communication network 102.

It should be noted that the communication network 102 has been simplified for ease of explanation. The communication network 102 may include other devices or components that are not shown. For example, the communication network 102 may include routers, switches, gateways, firewalls, and the like.

The AS 104 may be a computing device that includes a processor and memory. The AS 104 may be communicatively coupled to the DB 106. The DB 106 may include a computer readable storage medium that may store various information or data. For example, DB 106 may store user profiles, user log-in credentials, and the like. In one embodiment, stored documents associated with action tags that are created on an MFD 108 (discussed in further details below) may be stored in the AS 104 or the DB 106.

In one embodiment, the AS 104 may be communicatively coupled to local networks 112 and 114. The local networks 112 and 114 may be located in different geographic and/or physical locations. For example, the local network 112 may be a local network for an enterprise office in California and the local network 114 may be a local network for an enterprise office in New York. In one embodiment, an MFD 108 may be located in the local network 112 and an MFD 110 may be located in the local network 114.

Although two local networks 112 and 114 are illustrated in FIG. 1, it should be noted that any number of local networks may be communicatively coupled to the communication network 102 and the AS 104. Although a single MFD 108 or 110 is illustrated in the respective local networks 112 and 114, it should be noted that the local networks 112 and 114 may include any number of MFDs.

In one embodiment, the MFD 108 may be referred to as a "local MFD". For example, the MFD 108 may be a local MFD of a user or the MFD that a user interacts with the most. For example, the local network 112 may be where a user works daily.

Figure 2:
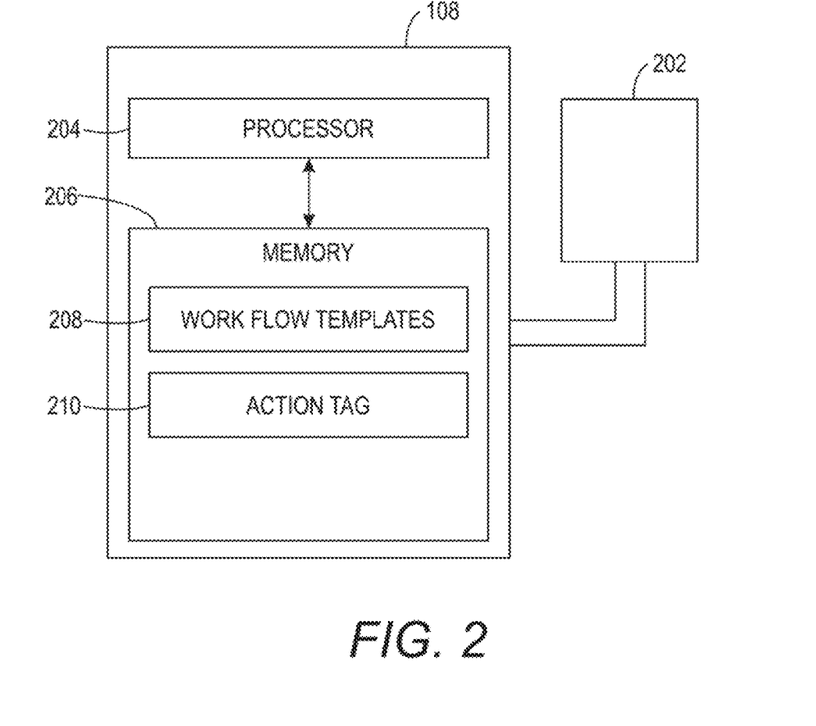
FIG. 2 illustrates a block diagram of an example MFD of the present disclosure.

FIG. 2 illustrates a block diagram of an example MFD 108 of the present disclosure. The MFD 110 may include the same components and be similar to the MFD 108 illustrated in FIG. 1. It should be noted that the MFD 108 has been simplified for ease of explanation and may include additional components that are not shown. For example, the MFD 108 may include a paper tray, a print engine, a digital front end, one or more finishing modules, communication interfaces (wired or wireless), and the like.

In one embodiment, the MFD 108 may include a display 202, processor 204, and a memory 206. The display 202 may provide a graphical user interface (GUI) to allow a user to create the action tags, the workflow templates with action tags, execute jobs via the workflow templates with action tags, and the like, discussed in further details below.

In one embodiment, the processor 204 may be communicatively coupled to the display 202 and the memory 206. The processor 204 may control operation of the display 202. The processor 204 may also execute instructions stored in the memory 206.

In one embodiment, the memory 206 may be any type of non-transitory computer readable medium. For example, the memory 206 may be a hard disk drive, a solid state drive, a read only memory, a random access memory, and the like. In one embodiment, the memory 206 may include workflow templates 208 and action tags 210.

In one embodiment, the workflow templates 208 may include values for various parameters associated with a job and/or various functions to be executed. For example, a workflow template 208 may set image parameters (e.g., color or black and white, brightness, contrast, and the like), zoom levels, a media size, a number of copies, and so forth. A workflow template 208 may define various finishing options for printing (e.g., collate, staple, and so forth). A workflow template 208 may define a particular function to be executed (e.g., scan the document with the selected image parameters and then email to a group of users).

In one embodiment, the actions tags 210 may include a tag (e.g., a label or file name for a particular stored document) that is associated with an action. The action may be a user-selected action. For example, the action may be "include" and be associated with a particular stored document. Thus, when the action tag is selected, the particular stored document may be automatically included.

To illustrate, a document may be scanned and an action tag that includes a stored document may be selected. The action tag may automatically include the stored document into the scanned document. Thus, a single file may be automatically created that includes the scanned document and the stored document. In other words, the action tag may save the user from having to print out the stored document, combine the printed document with an additional document, and then scan the combined physical pages of the printed document and the additional document.

In one embodiment, other actions may be selected. For example, actions may include attach (e.g., add as an attachment to an email generated for the scanned document), print (e.g., print the stored document with each copy of the scanned document that is printed), and the like. In one embodiment, the action may include an action to add a hyperlink to a storage location of a large file. The large file may be larger than a pre-determined size or larger than a pre-determined number of pages that may be too bulky to add to a scanned document or printed. As a result, a hyperlink may be added to a job.

In one embodiment, the action may include duplicate. For example, an extra copy of the stored document or scanned document can be saved to a particular location. For example, the document may be a sales receipt and the location may be an auditing location such that the user has a record of transactions In one embodiment, the action may include share. The share action may share a file or document via some method such as wireless, Bluetooth, a cloud storage service, and the like.

In one embodiment, the actions may include layers of automated instructions. For example, if the action is include, the user may specify to include the stored document at the beginning of the file or the end of the file. Thus, the single file that is created may have the stored document before the scanned document if the user chooses to have the include action at the beginning of the file. In another embodiment, if the action is include, the user may specify to match an orientation of the scanned document. For example, the scanned document may have text oriented in a landscape orientation. The stored document associated with the action tag may be in portrait orientation. When the action tag of include is executed, the action tag may automatically rotate the stored document into a landscape orientation to match the scanned document when including the stored document.

In one embodiment, the action tags 210 can be added to the workflow templates 208. For example, a workflow template 208 may be created or selected. Then, through a GUI shown in the display 202, an action tag 210 that has been created may be added to the workflow template 208. Thus, a job may be executed in accordance with the workflow template 208 and the selected action tag 210.

In one embodiment, the action tags 210 that are selected for various workflow templates 208 may be tracked. The MFD 108 may "learn" over time tendencies or patterns of which action tags 210 are selected for which workflow templates 208. Said another way, certain parameters selected for workflow templates 208 that are used or created may be associated with the same action tags 210. Thus, when a user creates a new workflow template 208, the MFD 108 may suggest an action tag 210 to include with the workflow template 208 if an action tag 210 is not added.

Figure 3:
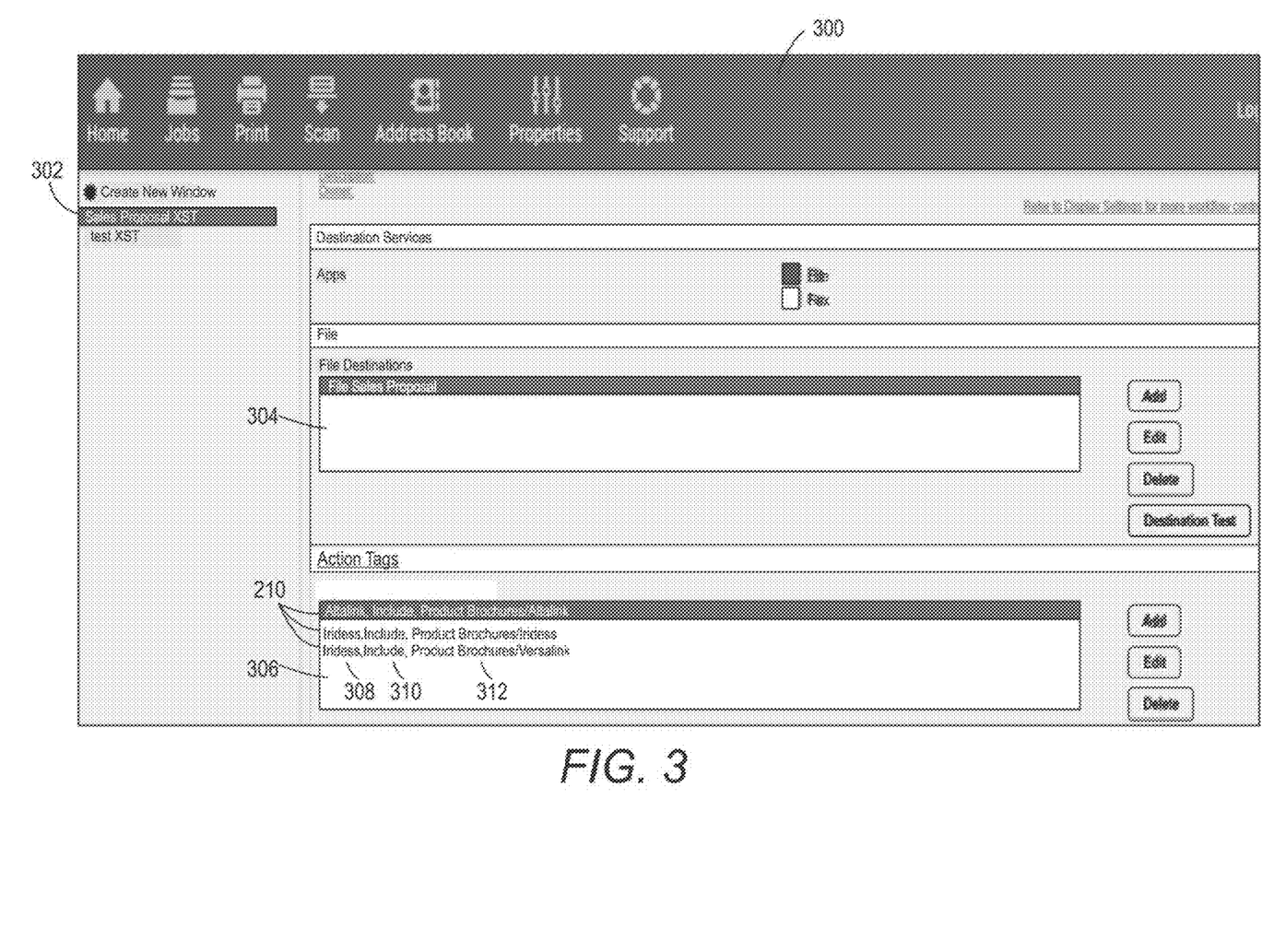
FIG. 3 illustrates an example of a screenshot for a GUI to build a job that includes a workflow template and an action tag of the present disclosure.

FIG. 3 illustrates an example of a GUI 300 that may be shown in the display 202. The GUI 300 may allow a user to build a job that includes a workflow template 208 and an action tag 210. FIG. 3 illustrates an example where a user is creating a workflow template 302 named "Sales Proposal". The workflow template 302 may be to store a scanned document into a file named "Sales Proposal" on the MFD 108, as shown in a window 304.

In one embodiment, the GUI 300 may also provide options to select various values for other functions that may be executed. For example, a drop down menu or radio buttons may allow the workflow template 302 to print or email a scanned document rather than store to file. When a different function is selected, the page may display boxes to enter values, email addresses, and the like, or drop down menus to select print parameters such as color, media size, finishing options, and so forth.

In one embodiment, a window 306 may provide available action tags 210 that have been created. For example, each action tag 210 may include a tag name 308, an action 310, and location 312 of a stored document. In one embodiment, a user may select or highlight one of the action tags 210 and add the selected action tag 210 to the workflow template 302. As a result, each time the workflow template 302 is executed for a job on the MFD 108, the action tag 210 may also be executed as part of the workflow template 302.

Figure 4:
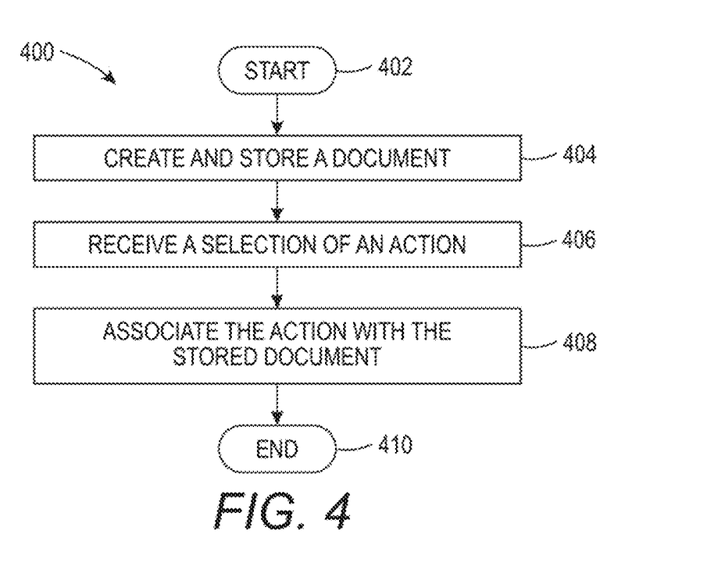
FIG. 4 illustrates a flowchart of an example method for creating an action tag of the present disclosure.
Figure 7:
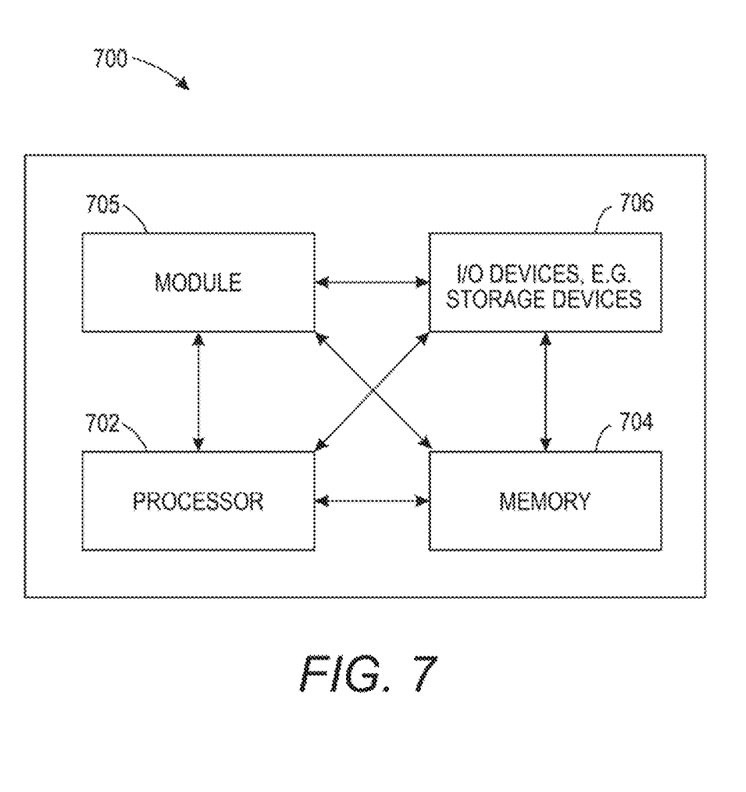
FIG. 7 illustrates a high-level block diagram of an example computer suitable for use in performing the functions described herein.

FIG. 4 illustrates a flowchart of an example method 400 for creating an action tag of the present disclosure. In one embodiment, one or more blocks of the method 400 may be performed by the MFD 108, or a computer/processor that controls operation of an MFD as illustrated in FIG. 7 and discussed below.

At block 402, the method 400 begins. At block 404, the method 400 creates and stores a document. For example, a company pamphlet may be created, scanned, and stored. The document may be stored in a local memory of the MFD or may be stored in a remote server (e.g., the DB 106 or AS 104 illustrated in FIG. 1). By storing the document in the remote server, the document may be accessed by any MFD to create an action tag.

At block 406, the method 400 receives a selection of an action. For example, the action may include actions such as include, attach, print, and the like. The actions may be automatically executed as part of a job that is executed on the MFD.

At block 408, the method 400 associates the action with the stored document. The association of the action with the stored document may create the action tag. The action tags may be presented in a window of a GUI to the user when workflow templates are created or selected. The action tags may be presented with a tag name, a tag action, and a file location. At block 410, the method 400 ends.

Figure 5:
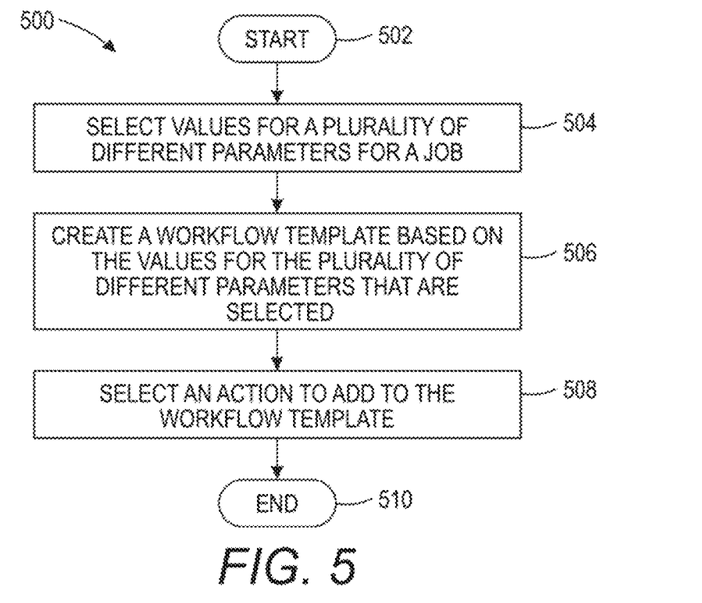
FIG. 5 illustrates a flowchart of an example method for creating a workflow that includes an action tag of the present disclosure.

FIG. 5 illustrates a flowchart of an example method 500 for creating a workflow that includes an action tag of the present disclosure. In one embodiment, one or more blocks of the method 500 may be performed by the MFD 108, or a computer/processor that controls operation of an MFD as illustrated in FIG. 7 and discussed below.

At block 502, the method 500 begins. At block 504, the method 500 selects values for a plurality of different parameters for a job. For example, the user may select to create a new workflow template and provide a name for the workflow template. After the name of the workflow template is created, the GUI may present various text boxes, drop down menus, radio selection buttons, and the like to enter values, select parameters or options, and the like. In one embodiment, the user may first select the various parameters and enter values for a document on the MFD. After the selections are made, the GUI may present the user with an option to save the settings as a workflow template.

At block 506, the method 500 creates a workflow template based on the values for the plurality of different parameters that are selected. For example, the workflow template may be saved on the MFD or in a remote server. The next time a user logs into the MFD, the user may select the workflow template for a job on the MFD. Thus, the user may not have to re-enter all of the values, parameters selections, and the like to execute the job. Rather, the user may simply select the workflow template, place the document in the MFD, and the job may be executed (e.g., automatically copying the document with a particular media size, in color, and a number of copies, or scanning the document as a particular file type and attaching the document in an email to a particular address, and the like).

At block 508, the method 500 selects an action tag to add to the workflow template. After the workflow template is created, a window in the GUI may present available action tags. The action tags may be previously created, as described above in the method 400. The user may select an action tag to add to the workflow.

In one embodiment, the MFD may suggest an action tag based machine learning. For example, based on the action tags that were previously selected for workflow templates with similar parameters, values, functions, and the like, the MFD may suggest an action tag if the user does not select or add an action tag to the workflow template. For example, for a sales brochure workflow template, the MFD may learn that an action tag to include a company description pamphlet is usually added to the workflow template. If the user does not select the action tag to include the company description pamphlet, the action tag can be suggested to the user. At block 510, the method 500 ends.

Figure 6:
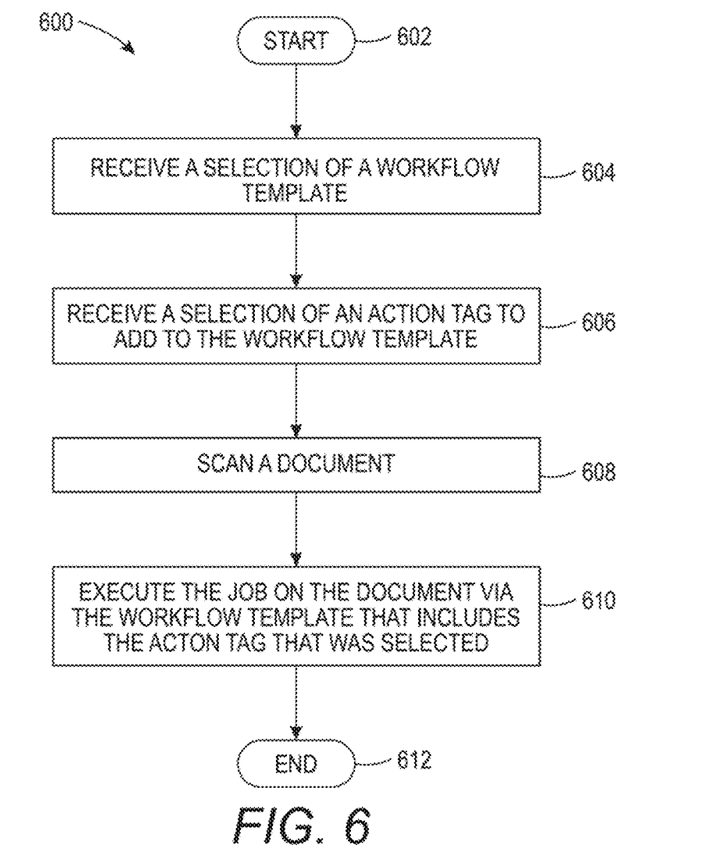
FIG. 6 illustrates a flow chart of an example method for executing a workflow that includes an action tag of the present disclosure.

FIG. 6 illustrates a flowchart of an example method 600 for executing a workflow that includes an action tag of the present disclosure. In one embodiment, one or more blocks of the method 600 may be performed by the MFD 108, or a computer/processor that controls operation of an MFD as illustrated in FIG. 7 and discussed below.

At block 602, the method 600 begins. At block 604, the method 600 receives a selection of a workflow template. For example, a user may select a workflow template to execute on a document for a particular job. The job may be a print job, a scanning job, an email job, or any other function that can be executed by the MFD. The workflow template may automatically set certain parameters associated with the job and execute the job.

At block 606, the method 600 receives a selection of an action tag to add to the workflow template. In one embodiment, the action tag may be selected as part of the workflow template that was selected. For example, the workflow template may have been created with an action tag included. In one embodiment, the action tag may be selected and added separately. For example, in some instances, the user may execute the workflow template without the action tag. In other instances, the user may add the action tag and execute the workflow template with the action tag.

At block 608, the method 600 scans a document. For example, the document may be placed on a document feeder of the MFD. After the workflow template and the action tag are selected, the document may be fed through the MFD and scanned.

At block 610, the method 600 executes the job on the document via the workflow template that includes the action tag that was selected. For example, the workflow template may be to scan the document and create a portable document file (.pdf file). The action tag may be to include a stored document with the scanned document. Thus, the job may be to scan the document and include the stored document to create a single .pdf file of the scanned document and the stored document.

In contrast, previous MFDs may require the user to print the stored document, combine the pages of the document and the printed stored document and then re-scan the physical pages together. However, the present disclosure provides a more efficient and streamlined process as documents that are regularly used and stored in the MFD may be added using the action tags without having to re-print, combine the physical pages, and re-scan the combination of documents. At block 612, the method 600 ends.

FIG. 7 depicts a high-level block diagram of a computer that is dedicated to perform the functions described herein. As depicted in FIG. 7, the computer 700 comprises one or more hardware processor elements 702 (e.g., a central processing unit (CPU), a microprocessor, or a multi-core processor), a memory 704, e.g., random access memory (RAM) and/or read only memory (ROM), a module 705 for executing a job on an MFD, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for executing a job on an MFD (e.g., a software program comprising computer-executable instructions) can be loaded into memory 704 and executed by hardware processor element 702 to implement the steps, functions or operations as discussed above in connection with the example methods 400, 500, and 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for executing a job on an MFD (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for executing a job on a multi-function device (MFD), comprising:
   receiving, by a processor of the MFD, a selection of a workflow template;
   receiving, by the processor, a selection of an action tag to add to the workflow template, wherein the action tag is associated with a stored document and comprises a tag name, an action to be executed by the MFD on the stored document, and a location of the stored document;
   scanning, by the processor, a document; and
   executing, by the processor, the job on the document via the workflow template and the action to be executed on the stored document associated with the action tag that was selected,
   wherein the action tag comprises including the stored document with the document that is scanned to create a single file comprising the stored document and the document that is scanned.

2. The method of claim 1, wherein executing the job comprises printing, storing, or emailing the single file.

3. The method of claim 1, wherein the stored document is stored in a memory of the MFD.

4. The method of claim 1, wherein the stored document is stored in a server that is located remotely from the MFD.

5. The method of claim 1, further comprising:
   receiving, by the processor, one or more job parameters to create the workflow template.

6. The method of claim 5, wherein the one or more job parameters comprise at least one print parameter and a media size.

7. The method of claim 1, further comprising:
   tracking, by the processor, the action tag selected for different workflow templates; and
   providing, by the processor, recommendation of the action tag to select based on the workflow template that is selected based on the tracking.

8. A non-transitory computer-readable medium storing a plurality of instructions, which when executed by a processor of a multi-function device (MFD), cause the processor to perform operations for executing a job on the MFD, the operations comprising:
   receiving a selection of a workflow template;
   receiving a selection of an action tag to add to the workflow template, wherein the action tag is associated with a stored document and comprises a tag name, an action to be executed by the MFD on the stored document, and a location of the stored document;
   scanning a document; and
   executing the job on the document via the workflow template and the action to be executed on the stored document associated with the action tag that was selected,
   wherein the action tag comprises including the stored document with the document that is scanned to create a single file comprising the stored document and the document that is scanned.

9. The non-transitory computer-readable medium of claim 8, wherein executing the job comprises printing, storing, or emailing the single file.

10. The non-transitory computer-readable medium of claim 8, wherein the stored document is stored in a memory of the MFD.

11. The non-transitory computer-readable medium of claim 8, wherein the stored document is stored in a server that is located remotely from the MFD.

12. The non-transitory computer-readable medium of claim 8, further comprising:
receiving one or more job parameters to create the workflow template.

13. The non-transitory computer-readable medium of claim 12, wherein the one or more job parameters comprise at least one print parameter and a media size.

14. The non-transitory computer-readable medium of claim 8, further comprising:
tracking the action tag selected for different workflow templates; and
providing recommendation of the action tag to select based on the workflow template that is selected based on the tracking.

15. A method for executing a job on a multi-function device (MFD), comprising:
creating, by a processor of the MFD, an action tag to cause the MFD to automatically include a stored document with another document that is processed via a workflow template;
receiving, by the processor, a selection of the workflow template for the job;
receiving, by the processor, a selection of the action tag to add to the workflow template;
scanning, by the processor, a document for the job;
processing, by the processor, the document in accordance with the workflow template;
processing, by the processor, the action tag on the document to include the stored document and create a single file that includes the document that is scanned and the stored document; and
executing, by the processor, the job on the single file.

16. The method of claim 15, wherein the executing comprises at least one of printing, storing, or emailing the single file.

* * * * *